US012644719B2

(12) United States Patent
Yamada

(10) Patent No.: US 12,644,719 B2
(45) Date of Patent: Jun. 2, 2026

(54) IN-VEHICLE CONTROL DEVICE

(71) Applicant: TOYOTA JIDOSHA KABUSHIKI KAISHA, Toyota (JP)

(72) Inventor: Yuki Yamada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 18/765,809

(22) Filed: Jul. 8, 2024

(65) Prior Publication Data

US 2025/0067567 A1     Feb. 27, 2025

(30) Foreign Application Priority Data

Aug. 23, 2023    (JP) ................................. 2023-135827

(51) Int. Cl.
G01C 21/34 (2006.01)
G01C 21/36 (2006.01)

(52) U.S. Cl.
CPC ..... G01C 21/3469 (2013.01); G01C 21/3667 (2013.01)

(58) Field of Classification Search
CPC ........................ G01C 21/3667; G01C 21/3469
USPC ........................................................ 701/418
See application file for complete search history.

(56) References Cited

U.S. PATENT DOCUMENTS

| | | | |
|---|---|---|---|
| 2012/0290506 A1* | 11/2012 | Muramatsu ........ | G01C 21/3679 701/400 |
| 2014/0207363 A1* | 7/2014 | Kanno ............... | G01C 21/3469 701/123 |
| 2022/0001852 A1 | 1/2022 | Kageura et al. | |

FOREIGN PATENT DOCUMENTS

JP          2022-013179 A       1/2022

* cited by examiner

*Primary Examiner* — Navid Z. Mehdizadeh
*Assistant Examiner* — Vincent Feng
(74) *Attorney, Agent, or Firm* — Oliff PLC

(57) ABSTRACT

An in-vehicle control device is mounted on a vehicle that includes an engine, a motor for traveling, a battery configured to supply electric power to the motor, and map information, and that is configured to perform electric traveling. The in-vehicle control device includes a processor. The processor is configured to display an electric traveling setting area, in which the vehicle performs electric traveling, on the map information using a first display method. The processor is configured to display an electric traveling possible area, in which the vehicle is able to perform electric traveling, on the map information using a second display method different from the first display method.

11 Claims, 4 Drawing Sheets

FIG. 2

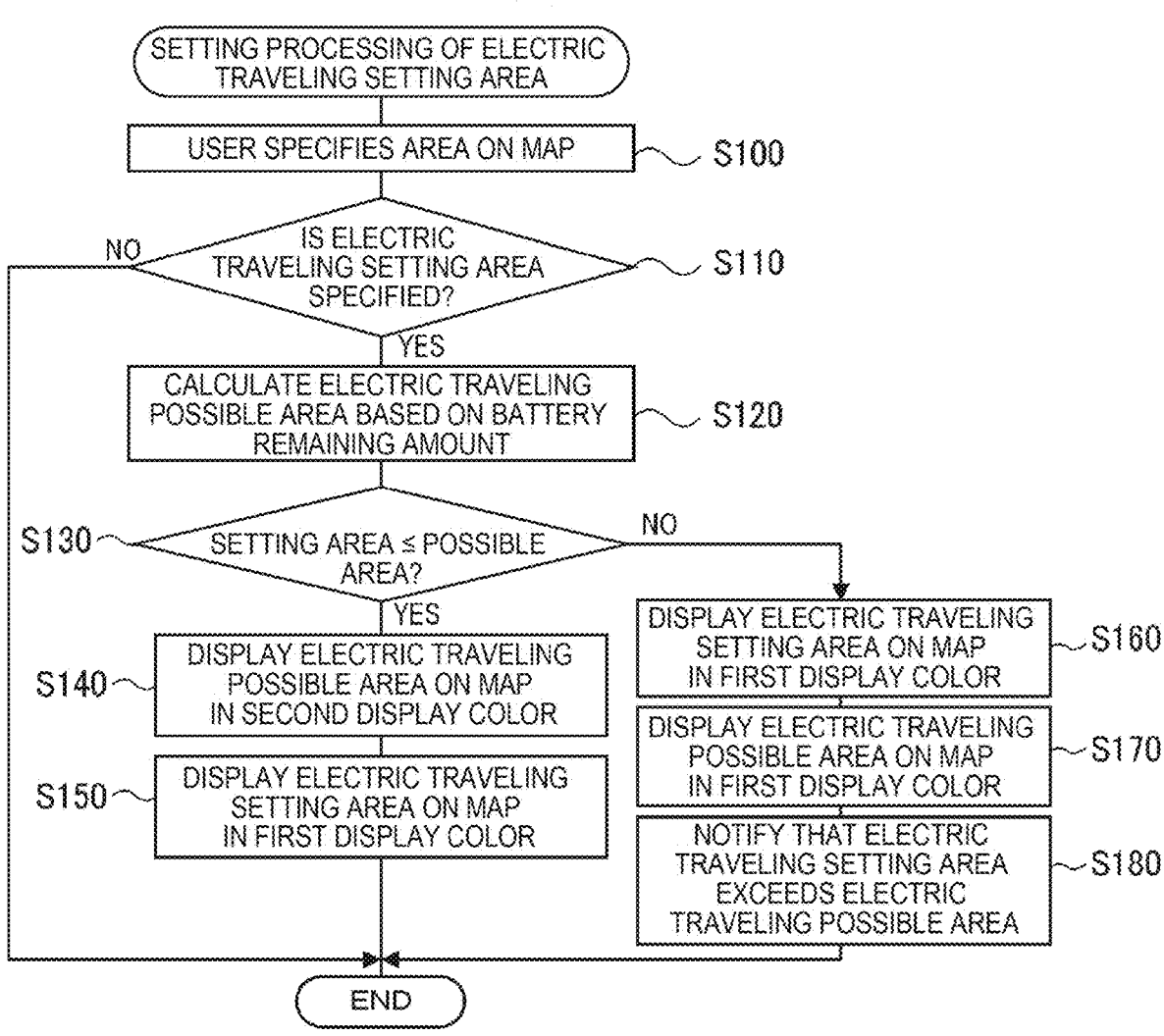

SETTING PROCESSING OF ELECTRIC TRAVELING SETTING AREA

USER SPECIFIES AREA ON MAP — S100

IS ELECTRIC TRAVELING SETTING AREA SPECIFIED? — S110
NO
YES

CALCULATE ELECTRIC TRAVELING POSSIBLE AREA BASED ON BATTERY REMAINING AMOUNT — S120

S130 — SETTING AREA ≤ POSSIBLE AREA?
NO
YES

S140 — DISPLAY ELECTRIC TRAVELING POSSIBLE AREA ON MAP IN SECOND DISPLAY COLOR

S150 — DISPLAY ELECTRIC TRAVELING SETTING AREA ON MAP IN FIRST DISPLAY COLOR

DISPLAY ELECTRIC TRAVELING SETTING AREA ON MAP IN FIRST DISPLAY COLOR — S160

DISPLAY ELECTRIC TRAVELING POSSIBLE AREA ON MAP IN FIRST DISPLAY COLOR — S170

NOTIFY THAT ELECTRIC TRAVELING SETTING AREA EXCEEDS ELECTRIC TRAVELING POSSIBLE AREA — S180

END

2km
GPS

A1     A2

ELECTRIC TRAVELING SETTING AREA EXCEEDS
ELECTRIC TRAVELING POSSIBLE AREA

IN-VEHICLE CONTROL DEVICE

CROSS-REFERENCE TO RELATED APPLICATION

This application claims priority to Japanese Patent Application No. 2023-135827 filed on Aug. 23, 2023 incorporated herein by reference in its entirety.

BACKGROUND

1. Technical Field

The present disclosure relates to an in-vehicle control device.

2. Description of Related Art

As a type of in-vehicle control devices, a device has been proposed that is installed in a vehicle that preforms electric traveling when it is determined that a hybrid electric vehicle is within an electric traveling area in which the engine should stop operating to perform electric traveling (for example, see Japanese Unexamined Patent Application Publication No. 2022-013179 (JP 2022-013179 A)). In this in-vehicle control device, when it is determined that a hybrid electric vehicle is located outside the electric traveling area and within an entrance area adjacent to the boundary of the electric traveling area, an occupant is notified that there is a possibility that the hybrid electric vehicle will soon enter the electric traveling area.

SUMMARY

However, the above-mentioned in-vehicle control device does not provide a notification to a driver even when it is not possible to complete the electric traveling area by electric traveling with the engine stopped depending on the remaining amount of a battery, so that the driver may mistakenly believe that the electric traveling area can be completed by electric traveling.

The present disclosure provides an in-vehicle control device that notifies a driver or user of whether it is possible to complete, by electric traveling, an area in which electric traveling is set.

According to an aspect of the present disclosure, an in-vehicle control device is mounted on a vehicle that includes an engine, a motor for traveling, a battery configured to supply electric power to the motor, and map information, and that is configured to perform electric traveling. The in-vehicle control device includes a processor. The processor is configured to display an electric traveling setting area, in which the vehicle performs electric traveling, on the map information using a first display method. The processor is configured to display an electric traveling possible area, in which the vehicle is able to perform electric traveling, on the map information using a second display method different from the first display method.

In the in-vehicle control device of the present disclosure, the electric traveling setting area, in which the vehicle performs electric traveling, is displayed on the map information in the first display method, and the electric traveling possible area, in which the vehicle is able to perform electric traveling is displayed on the map information in the second display method different from the first display method. Accordingly, the driver or the user can be informed of whether it is possible to complete the electric traveling setting area by electric traveling. Note that the first display method and the second display method may be a method of displaying the areas using different colors.

In the in-vehicle control device according to the aspect of the present disclosure, the processor may be configured to: display the electric traveling possible area in the electric traveling setting area using the second display method; and display an electric traveling impossible area, in which the vehicle is not able to perform electric traveling, using a third display method. According to the above configuration, the user can be clearly informed of the electric traveling possible area and the electric traveling impossible area.

In the in-vehicle control device according to the aspect of the present disclosure, the processor may be configured to set the electric traveling setting area based on at least one of an input from a user and the map information. According to the above configuration, the user can freely set the electric traveling setting area.

In the in-vehicle control device according to the aspect of the present disclosure, the processor may be configured to, when setting the electric traveling setting area based on the input from the user, notify that the electric traveling setting area is not able to be set in a case where the electric traveling setting area is wider than the electric traveling possible area. In the in-vehicle control device according to the aspect of the present disclosure, the processor may be configured not to, when setting the electric traveling setting area based on the input from the user, set the electric traveling setting area in a case where the electric traveling setting area is wider than the electric traveling possible area. According to the above configuration, the user can be informed that the electric traveling setting area is wider than the electric traveling possible area.

In the in-vehicle control device according to the aspect of the present disclosure, the processor may be configured to, when attempting to set the electric traveling setting area in an area less than a predetermined distance from an electric traveling setting area that has already been set based on the input from the user, notify that the electric traveling setting area is not able to be set. In the in-vehicle control device according to the aspect of the present disclosure, the processor may be configured not to, when attempting to set the electric traveling setting area in an area less than a predetermined distance from an electric traveling setting area that has already been set based on the input from the user, set the electric traveling setting area. According to the above configuration, the user can be informed that a new electric traveling setting area cannot be set within the predetermined distance from the electric traveling setting area that has already been set.

In the in-vehicle control device according to the aspect of the present disclosure, the processor may be configured to set the electric traveling setting area through communication with a mobile terminal of the user. The processor may be configured to perform the communication such that the same display as at least one of display of the electric traveling setting area on the map information using the first display method and display of the electric traveling possible area on the map information using the second display method is performed on the mobile terminal. According to the above configuration, the user can set the electric traveling setting area using the mobile terminal and check the electric traveling setting area and the electric traveling possible area using the mobile terminal.

In the in-vehicle control device according to the aspect of the present disclosure, the processor may be configured to calculate the electric traveling possible area based on a remaining amount of the battery or a fully charged amount of the battery. In the in-vehicle control device according to the aspect of the present disclosure, the processor may be configured to calculate the electric traveling possible area based on a remaining amount of the battery that is assumed when the vehicle travels a predetermined distance while driving the engine and charging the battery.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 is a flowchart showing an example of setting processing of an electric traveling setting area;

FIG. 3 is an explanatory diagram showing an example of the electric traveling setting area and an electric traveling possible area displayed on a display device or a mobile terminal;

DETAILED DESCRIPTION OF EMBODIMENTS

Figure 1:
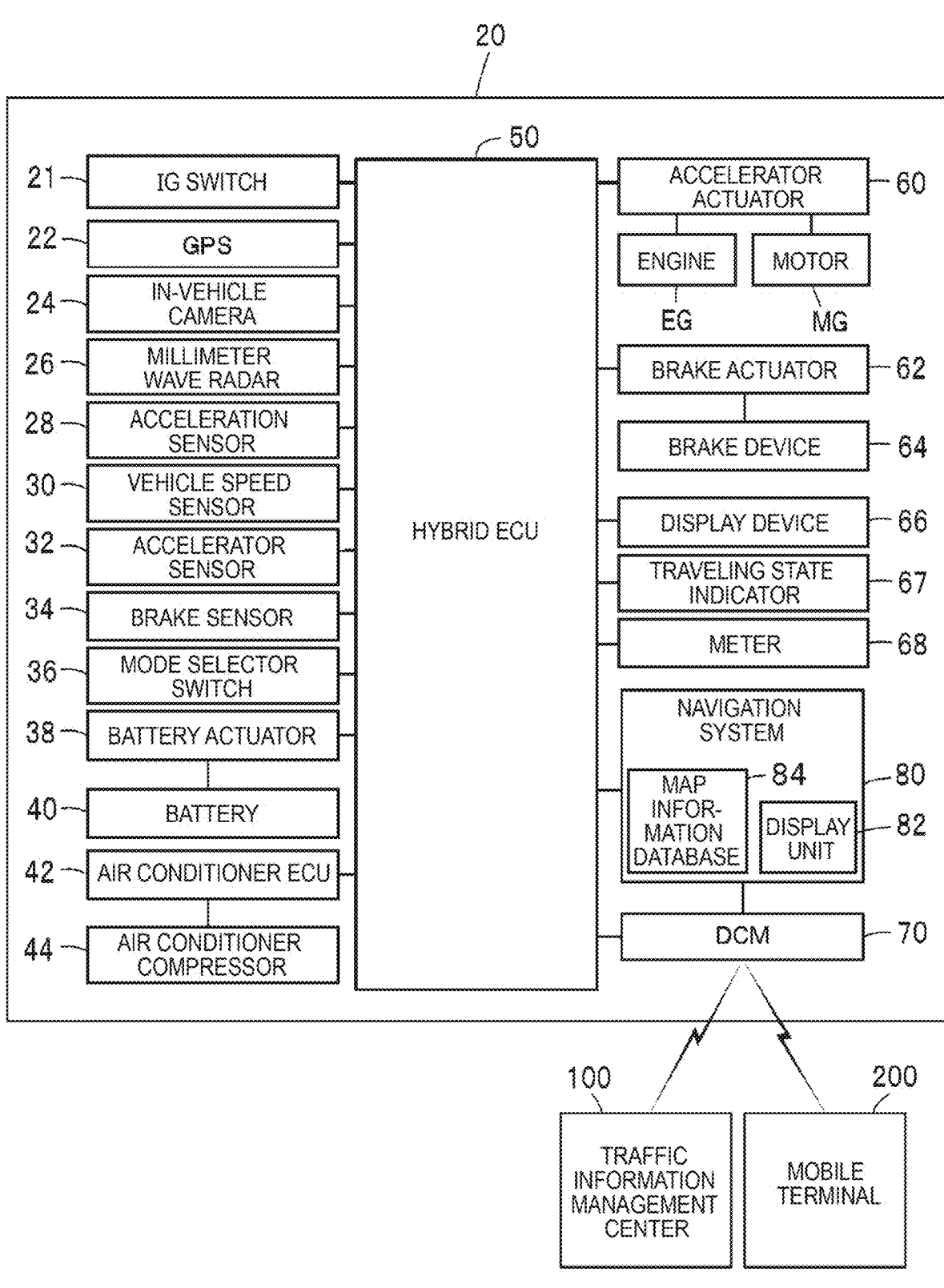
FIG. 1 is a block diagram that shows an example of a hybrid electric vehicle equipped with an in-vehicle control device as an embodiment of the present disclosure, and that is centered on a hybrid electronic control unit (ECU)

Next, a mode (embodiment) for carrying out the present disclosure will be described. FIG. 1 is a block diagram that shows an example of a hybrid electric vehicle 20 equipped with an in-vehicle control device as an embodiment of the present disclosure, and that is centered on a hybrid electronic control unit (hereinafter referred to as the hybrid ECU) 50. The hybrid ECU 50 is an example of an in-vehicle control device. As illustrated, the hybrid electric vehicle 20 of the embodiment includes an engine EG and a motor MG as power sources. The hybrid electric vehicle 20 of the embodiment travels by switching between two traveling modes: a charge depleting (CD) mode in which electric traveling is prioritized so as to reduce a storage ratio SOC of a battery 40, and a charge sustaining (SC) mode in which the storage ratio SOC of the battery 40 is maintained at a target ratio by combining electric traveling and hybrid traveling. Electric traveling is a mode in which traveling is performed using only power from the motor MG with the engine EG stopped, and hybrid traveling is a mode in which traveling is performed using power from the engine EG and power from the motor MG with the engine EG operated.

In addition to the power sources, the hybrid electric vehicle 20 of the embodiment includes an ignition switch 21, a global positioning system or global positioning satellite (GPS) 22, an in-vehicle camera 24, a millimeter wave radar 26, an acceleration sensor 28, a vehicle speed sensor 30, an accelerator sensor 32, a brake sensor 34, a mode selector switch 36, a battery actuator 38, the battery 40, an air conditioner electronic control unit (hereinafter referred to as the air conditioner ECU) 42, an air conditioner compressor 44, the hybrid ECU 50, an accelerator actuator 60, a brake actuator 62, a brake device 64, a display device 66, a traveling state indicator 67, a meter 68, a data communication module (DCM) 70, a navigation system 80, and the like.

The GPS 22 is a device that detects the position of a vehicle based on signals transmitted from a plurality of GPS satellites. The in-vehicle camera 24 is a camera that images the surroundings of the vehicle, and includes, for example, a front camera that images the front of the vehicle, and a rear camera that images the rear of the vehicle. The millimeter wave radar 26 detects the inter-vehicle distance and relative speed between a host vehicle and a vehicle in front, and the inter-vehicle distance and relative speed between the host vehicle and a vehicle behind.

The acceleration sensor 28 is, for example, a sensor that detects acceleration in the longitudinal direction of the vehicle, or detects acceleration in the right-left direction (lateral direction) of the vehicle. The vehicle speed sensor 30 detects a vehicle speed based on a wheel speed and the like. The accelerator sensor 32 detects an accelerator operation amount depending on the amount of depression of an accelerator pedal by a driver. The brake sensor 34 detects a brake position as the amount of depression of a brake pedal by the driver. The mode selector switch 36 is a switch that is disposed near a steering wheel of a driver's seat and is used to switch between the CD mode and the CS mode.

The battery actuator 38 detects the state of the battery 40, such as voltage across terminals, charging/discharging current, and battery temperature, and manages the battery 40 based on these. The battery actuator 38 calculates the storage ratio SOC as a ratio of the remaining storage capacity to the total storage capacity based on the charging/discharging current, and calculates, based on the storage ratio SOC, battery temperature, etc., an allowable maximum output power (output limit Wout) that may be output from the battery 40 and an allowable maximum input power (input limit Win) that may be input to the battery 40. The battery 40 is configured as a rechargeable and dischargeable secondary battery, and can be, for example, a lithium ion battery, a nickel metal hydride battery, a lead acid battery, or the like.

The air conditioner ECU 42 is configured as a microcomputer centered on a central processing unit (CPU) (not shown), and includes a read-only memory (ROM), a random access memory (RAM), a flash memory, an input port, an output port, a communication port, etc. in addition to the CPU. The air conditioner ECU 42 is incorporated in an air conditioner that air-conditions a passenger compartment, and drives and controls the air conditioner compressor 44 in the air conditioner so that the temperature of the passenger compartment becomes a set temperature.

The engine EG is configured, for example, as an internal combustion engine. The motor MG is configured as an electric motor that also functions as a generator, such as a synchronous generator-motor. The motor MG is connected to the battery 40 via an inverter (not shown), and can output driving force using power supplied from the battery 40 and charge the battery 40 with generated power.

The hybrid ECU 50 is configured as a microcomputer centered on a CPU (not shown), and includes, in addition to the CPU, a ROM, a RAM, a flash memory, an input port, an output port, a communication port, and the like. The hybrid ECU 50 sets the traveling mode, and sets a target operation point (target rotation speed and target torque) for the engine EG and a torque command for the motor MG based on the set traveling mode, an accelerator operation amount from the accelerator sensor 32, a brake position from the brake sensor 34, and an output limit and an input limit from the battery actuator 38. Note that the hybrid ECU 50 does not start in the accessory-on state, but starts in the ready-on state.

During the electric traveling, the hybrid ECU 50 sets a required driving force and required power based on the accelerator operation amount from the accelerator sensor 32 and the vehicle speed from the vehicle speed sensor 30, sets the torque command for the motor MG so as to output the required driving force and required power to the vehicle, and transmits the set torque command to the accelerator actuator 60. During the hybrid traveling, the hybrid ECU 50 sets the target operation point for the engine EG and the torque command for the motor MG so as to output the required driving force and the required power to the vehicle, and transmits the target operation point and the torque command to the accelerator actuator 60. Further, when the brake pedal is depressed, the hybrid ECU 50 sets a required braking force based on the brake position from the brake sensor 34 and the vehicle speed from the vehicle speed sensor 30, sets a regeneration torque command for regenerative control of the motor MG based on the required braking force and the vehicle speed as well as a target braking force for the brake device, transmits the torque command to the accelerator actuator 60, and transmits the target braking force to the brake actuator 62.

The accelerator actuator 60 drives and controls the engine EG and the motor MG based on the target operation point and the torque command set by the hybrid ECU 50. The accelerator actuator 60 performs intake air amount control, fuel injection control, ignition control, intake valve opening/closing timing control, etc. so that the engine EG is operated at the target operation point (target rotation speed and target torque). Further, the accelerator actuator 60 performs switching control of switching elements included in the inverter for driving the motor MG so that a torque corresponding to the torque command is output from the motor MG.

The brake actuator 62 controls the brake device 64 so that the target braking force set by the hybrid ECU 50 is applied to the vehicle by the brake device 64. The brake device 64 is configured as, for example, a hydraulically driven friction brake.

The display device 66 is built into, for example, an instrument panel in front of the driver's seat, displays various types of information, and also functions as a touch panel. The traveling state indicator 67 has a battery electric vehicle (BEV) indicator and a hybrid electric vehicle (HEV) indicator (not shown). When the vehicle is traveling on the motor, the BEV indicator is lit up and the HEV indicator is turned off, and when the vehicle is performing hybrid traveling, the BEV indicator is turned off and the HEV indicator is lit up. The meter 68 is built into, for example, the instrument panel in front of the driver's seat.

The DCM 70 transmits information about the host vehicle to a traffic information management center 100 and a mobile terminal 200 of a user, and receives road traffic information from the traffic information management center 100 and data from the mobile terminal 200 such as a smartphone or a tablet. The information about the host vehicle includes, for example, the position of the host vehicle, vehicle speed, traveling power, and traveling mode. The road traffic information includes, for example, information on current and future traffic jams, information on current average vehicle speeds and predicted future average vehicle speeds in sections on a traveling route, information on traffic regulations, information on weather, information on road surface conditions, and information on maps. The DCM 70 communicates with the traffic information management center 100 at predetermined intervals (such as, every 30 seconds, every minute, or every two minutes).

The navigation system 80 is a system for guiding the host vehicle to a set destination, and includes a display unit 82 and a map information database 84. The display unit 82 is a functional block that has a function of displaying a route to the destination, the position of the host vehicle, etc. on the display device 66 based on map information. The navigation system 80 communicates with the traffic information management center 100 via the DCM 70. When a destination is set, the navigation system 80 sets a route based on information on the destination, information on the current location (the current position of the host vehicle) acquired by the GPS 22, and information stored in the map information database 84. The navigation system 80 communicates with the traffic information management center 100 at every predetermined time (such as, every three minutes, or every five minutes) to acquire the road traffic information, and provides route guidance based on the road traffic information.

When the navigation system 80 provides the route guidance, each time the navigation system 80 acquires road traffic information from the traffic information management center 100 (or at every predetermined time), the navigation system 80 generates, as predictive information, load information etc. necessary to travel traveling sections based on: information of each traveling section within the traveling route out of the road traffic information acquired from the traffic information management center 100, information on traveling load, the vehicle speed of the host vehicle, the traveling power of the host vehicle, and the traveling mode of the host vehicle. The navigation system 80 then transmits the generated information to the hybrid ECU 50. The predictive information includes: host vehicle information such as the position, vehicle speed, traveling power, and traveling mode of the host vehicle; information on current and future traffic jams, information on current average vehicle speeds and predicted future average vehicle speeds in sections on the traveling route, information on traffic regulations, information on weather, information on road surface conditions, and information on maps.

Next, the operation of the hybrid ECU 50 in the hybrid electric vehicle 20 configured as described above, particularly the operation when an area in which the vehicle travels by electric traveling, will be described. FIG. 2 is a flowchart showing setting processing of an electric traveling setting area as an example of processing when an area in which the vehicle travels by electric traveling (electric traveling setting area) is set by a user's operation.

In the setting processing of the electric traveling setting area, first, an area specified by the user on the map is accepted (step S100). This area setting may be performed using a touch panel function of the display device 66, or may be performed through communication with the mobile terminal 200 in which application software for setting the electric traveling setting area is installed.

Subsequently, it is determined whether the area specification in step S100 is specification of an electric traveling setting area (step S110). Specifically, determination is made based on the user's input as to whether the area is specified for the electric traveling setting area or the area is specified for another purpose. When it is determined that the area specification is not specification of the electric traveling setting area, it is determined that the area is not a target of the processing, and the processing ends.

When it is determined that the area specification in step S110 is specification of the electric traveling setting area, an area in which electric traveling is possible (electric traveling possible area) is calculated based on the remaining amount of the battery 40 (step S120). In this case, as the remaining amount of the battery 40, the remaining amount at that moment may be used, the remaining amount of the battery 40 when the vehicle travels from the current position to the electric traveling setting area may be calculated and used, the remaining amount of the battery 40 after the vehicle travels by a predetermined distance may be calculated and used, or the remaining amount when the battery 40 is fully charged (full charge remaining amount) may be used. When calculating, as the remaining amount of the battery 40, the remaining amount that is expected when the vehicle travels from the current position to the electric traveling setting area, it may be assumed that the battery 40 is charged by hybrid traveling. When calculating, as the remaining amount of the battery 40, the remaining amount of the battery 40 after the vehicle travels by a predetermined distance, it may be assumed that the engine EG is forcibly driven to charge the battery 40 as much as possible, or the engine EG is driven to such an extent that the driver and an occupant do not feel uncomfortable to charge the battery 40.

Next, it is determined whether the electric traveling setting area is equal to or smaller than the electric traveling possible area (step S130). When it is determined that the electric traveling setting area is equal to or smaller than the electric traveling possible area, the electric traveling possible area is displayed on the map in a second display color (step S140), and the electric traveling setting area is displayed on the map in a first display color (step S150), and the processing ends. FIG. 3 shows an example of the electric traveling setting area and the electric traveling possible area that are displayed on the display device 66 or the mobile terminal 200 when it is determined that the electric traveling setting area is equal to or smaller than the electric traveling possible area. In the figure, A1 indicates the electric traveling setting area, and A2 indicates the electric traveling possible area. As shown in the figure, the electric traveling setting area A1 is displayed inside the electric traveling possible area A2. Here, the first display color and the second display color may be any colors as long as they are different colors. Note that displaying the electric traveling setting area on the map in the first display color after displaying the electric traveling possible area on the map in the second display color is for performing the processing of changing the display color of the electric traveling setting area A1 included in the electric traveling possible area A2 in the second display color to the first display color.

Figure 4:
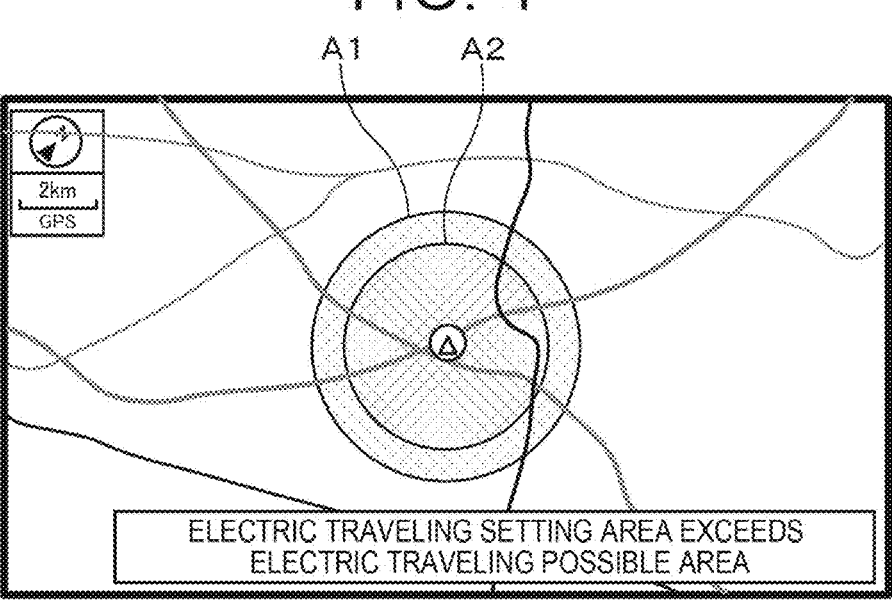
FIG. 4 is an explanatory diagram showing an example of the electric traveling setting area and the electric traveling possible area displayed on the display device or the mobile terminal.

When it is determined in step S130 that the electric traveling setting area is larger than the electric traveling possible area, the electric traveling setting area is displayed on the map in the first display color (step S160), and the electric traveling possible area is displayed on the map in the second display color (step S170). It is notified that the electric traveling setting area exceeds the electric traveling possible area (step S180), and the processing ends. FIG. 4 shows an example of the electric traveling setting area and the electric traveling possible area that are displayed on the display device 66 or the mobile terminal 200 when it is determined that the electric traveling setting area is larger than the electric traveling possible area. As shown in the figure, the electric traveling setting area A1 is displayed outside the electric traveling possible area A2. Note that displaying the electric traveling possible area on the map in the second display color after displaying the electric traveling setting area on the map in the first display color is for performing the processing of changing the display color of the electric traveling possible area A2 included in the electric traveling setting area A1 in the first display color to the second display color. In addition, in the example in FIG. 4, "the electric traveling setting area exceeds the electric traveling possible area" is displayed on the display device 66, and an audible notification to that effect is also provided.

In the hybrid ECU 50 that functions as the in-vehicle control device as described above, when the user sets the electric traveling setting area, the electric traveling possible area is calculated based on the remaining amount of the battery 40, the electric traveling setting area is displayed on the display device 66 in the first display color along with map information, and the electric traveling possible area is displayed in the second display color. Accordingly, the driver or the user can be informed of whether it is possible to complete the electric traveling setting area by electric traveling. Moreover, when the electric traveling setting area is larger than the electric traveling possible area, a notification to that effect is provided. Therefore, the user can be more reliably informed that the electric traveling setting area is larger than the electric traveling possible area.

Figure 5:
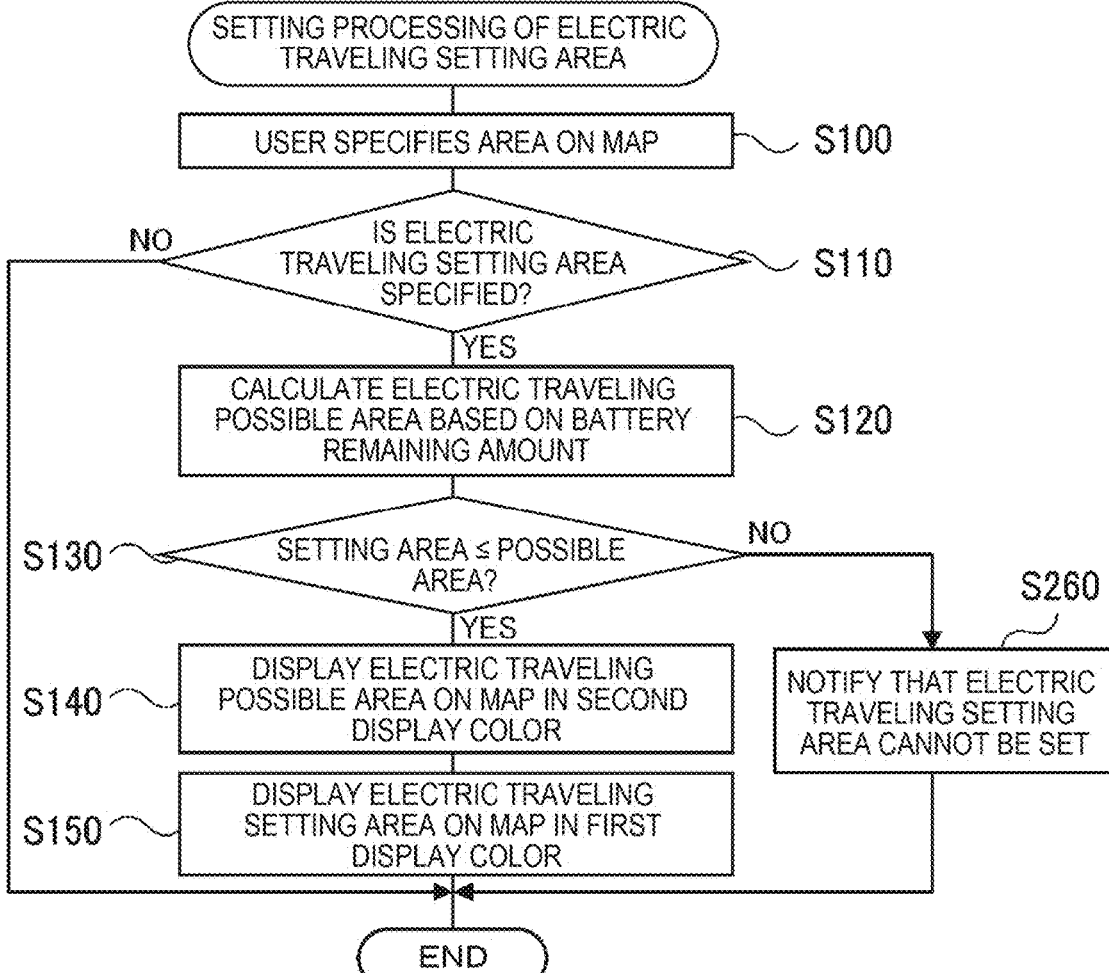
FIG. 5 is a flowchart showing an example of the setting processing of the electric traveling setting area in a modified example.

In the hybrid ECU 50 of the embodiment, when the electric traveling setting area is larger than the electric traveling possible area, the electric traveling setting area is displayed on the map in the first display color, the electric traveling possible area is displayed on the map in the second display color, and it is notified that the electric traveling setting area exceeds the electric traveling possible area. However, when the electric traveling setting area is larger than the electric traveling possible area, a notification that the electric traveling setting area cannot be set may be provided by display on the display device 66 or by audio output instead of displaying the electric traveling setting area in the first display color and displaying the electric traveling possible area in the second display color. An example of setting processing of the electric traveling setting area in this case is shown in FIG. 5. In the setting processing of the electric traveling setting area in FIG. 5, step S260 is executed in place of steps S160 to S180 of the setting processing of the electric traveling setting area in FIG. 2. That is, when it is determined in step S130 that the electric traveling setting area is larger than the electric traveling possible area, it is notified that the electric traveling setting area cannot be set (step S260), and the processing ends. Note that when the electric traveling setting area is larger than the electric traveling possible area, the electric traveling setting area may not be set without notifying that the electric traveling setting area cannot be set.

Figure 6:
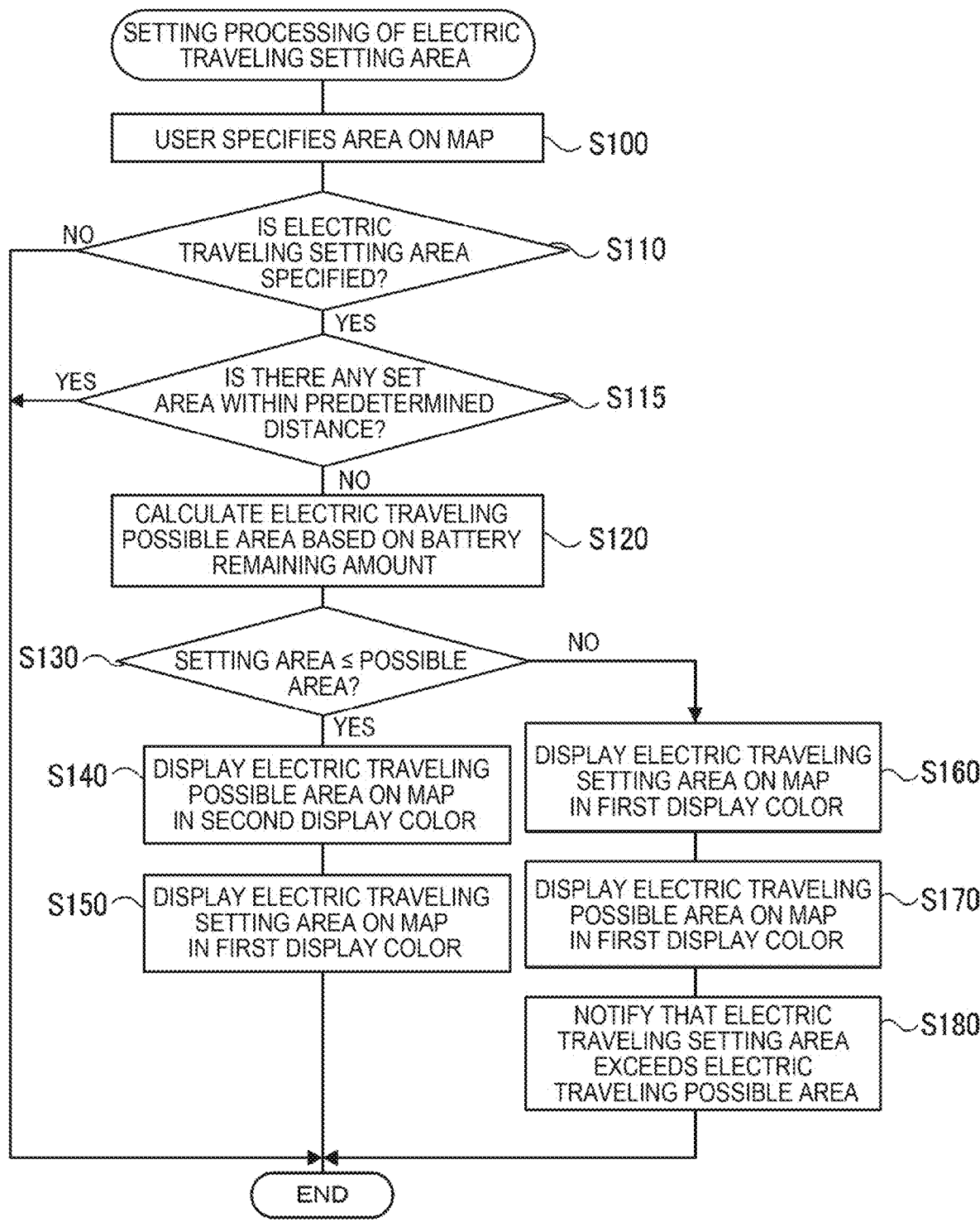
FIG. 6 is a flowchart showing an example of the setting processing of the electric traveling setting area in a modified example.

In the hybrid ECU 50 of the embodiment, the electric traveling setting area is set by specifying, by the user, an area on the map, but when an electric traveling setting area has already been set within a predetermined distance from the specified area, a new electric traveling setting area may not be set. An example of setting processing of the electric traveling setting area in this case is shown in FIG. 6. In the setting processing of the electric traveling setting area in FIG. 6, step S115 is executed between step S110 and step S120 of the setting processing of the electric traveling setting area in FIG. 2. In the setting processing of the electric traveling setting area in FIG. 6, when it is determined that the area specification in step S110 is specification of the electric traveling setting area, it is determined whether an electric traveling setting area has already been set within a predetermined distance from the area specified on the map by the user (step S115). The predetermined distance may be 1 km, 3 km, 5 km, 10 km, etc. When it is determined that an electric traveling setting area has already been set within the predetermined distance, the processing ends without setting the electric traveling setting area. On the other hand, when it is determined that no electric traveling setting area has been set within the predetermined distance, the processing from step S120 onwards is executed, and the processing ends. Note that when it is determined that an electric traveling setting area has already been set within the predetermined distance, a notification that the electric traveling setting area cannot be set may be provided by display on the display device 66 or by audio output.

In the hybrid ECU 50 of the embodiment, the electric traveling setting area is set by specifying, by the user, an area on the map, but the electric traveling setting area may be an area set in advance in the map information database 84.

In the hybrid ECU 50 of the embodiment, the electric traveling setting area is displayed on the map in the first display color, and the electric traveling possible area is displayed on the map in the second display color. However, in addition to this, an electric traveling impossible area that is an area in which electric traveling is impossible may be displayed on the map in a third display color. In this case, when the electric traveling setting area is larger than the electric traveling possible area, of the electric traveling setting area, an area excluding the electric traveling possible area is the electric traveling impossible area. Therefore, the electric traveling possible area in the second display color and the electric traveling impossible area in the third display color are displayed on the map. Note that in this case, the third display color may be the same as the first display color. That is, of the electric traveling setting area, the area excluding the electric traveling possible area is the electric traveling impossible area. Accordingly, the area displayed in the first display color is the electric traveling impossible area.

The correspondence between the main elements of the embodiment and the main elements of the present disclosure described in SUMMARY will be explained. In the embodiment, the engine EG is an example of an "engine," the motor MG is an example of a "motor," the battery 40 is an example of a "battery," the map information database 84 is an example of "map information", the hybrid electronic control unit 50 is an example of an "in-vehicle control device."

As for the correspondence between the main elements of the embodiment and the main elements of the present disclosure described in SUMMARY, since the embodiment is an example for specifically describing a mode for carrying out the present disclosure described in SUMMARY, the embodiment does not limit the elements of the present disclosure described in SUMMARY. In other words, the interpretation of the present disclosure described in SUMMARY should be performed based on the description in SUMMARY, and the embodiment is merely a specific example of the present disclosure described in SUMMARY.

Although the present disclosure has been described above using the embodiment, the present disclosure is not limited to the embodiment in any way, and may be implemented in various modes without departing from the scope of the present disclosure.

The present disclosure can be used in the manufacturing industry of in-vehicle control devices and the like.

What is claimed is:

1. An in-vehicle control device mounted on a vehicle that (i) includes an engine, a motor for traveling, a battery configured to supply electric power to the motor, and map information and (ii) is configured to perform electric traveling, the in-vehicle control device comprising a processor configured to:

display an electric traveling setting area, in which the vehicle should perform electric traveling, on the map information using a first display method, the electric traveling setting area having been set without reference to a remaining amount of the battery or a fully charged amount of the battery; and display an electric traveling possible area, in which the vehicle is able to perform electric traveling, on the map information using a second display method different from the first display method, the electric traveling possible area being different from the electric traveling setting area.

2. The in-vehicle control device according to claim 1, wherein the processor is configured to:

display the electric traveling possible area in the electric traveling setting area using the second display method; and display an electric traveling impossible area, in which the vehicle is not able to perform electric traveling, using a third display method.

3. The in-vehicle control device according to claim 1, wherein the processor is configured to set the electric traveling setting area based on at least one of an input from a user and the map information.

4. The in-vehicle control device according to claim 3, wherein the processor is configured to, when setting the electric traveling setting area based on the input from the user, notify that the electric traveling setting area is not able to be set in a case where the electric traveling setting area is wider than the electric traveling possible area.

5. The in-vehicle control device according to claim 3, wherein the processor is configured not to, when setting the electric traveling setting area based on the input from the user, set the electric traveling setting area in a case where the electric traveling setting area is wider than the electric traveling possible area.

6. The in-vehicle control device according to claim 3, wherein the processor is configured to, when attempting to set the electric traveling setting area in an area less than a predetermined distance from an electric traveling setting area that has already been set based on the input from the user, notify that the electric traveling setting area is not able to be set.

7. The in-vehicle control device according to claim 3, wherein the processor is configured not to, when attempting to set the electric traveling setting area in an area less than a predetermined distance from an electric traveling setting area that has already been set based on the input from the user, set the electric traveling setting area.

8. The in-vehicle control device according to claim 3, wherein the processor is configured to:

set the electric traveling setting area through communication with a mobile terminal of the user; and perform the communication such that the same display as at least one of display of the electric traveling setting area on the map information using the first display method and display of the electric traveling possible area on the map information using the second display method is performed on the mobile terminal.

9. The in-vehicle control device according to claim 1, wherein the processor is configured to calculate the electric traveling possible area based on the remaining amount of the battery or the fully charged amount of the battery.

10. The in-vehicle control device according to claim 1, wherein the processor is configured to calculate the electric traveling possible area based on the remaining amount of the battery that is assumed when the vehicle travels a predetermined distance while driving the engine and charging the battery.

11. The in-vehicle control device according to claim 1, wherein the electric traveling setting area is set based on input from a user.

\* \* \* \* \*